(12) United States Patent
Ehara et al.

(10) Patent No.: US 11,687,026 B2
(45) Date of Patent: Jun. 27, 2023

(54) SEAL BEARING AND IMAGE FORMING APPARATUS

(71) Applicant: Konica Minolta, Inc., Tokyo (JP)

(72) Inventors: Yoshinobu Ehara, Hino (JP); Hajime Mori, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/698,030

(22) Filed: Mar. 18, 2022

(65) Prior Publication Data
US 2022/0299931 A1 Sep. 22, 2022

(30) Foreign Application Priority Data

Mar. 18, 2021 (JP) .............................. JP2021-045134

(51) Int. Cl.
*G03G 15/08* (2006.01)
*G03G 21/16* (2006.01)
*F16C 33/74* (2006.01)

(52) U.S. Cl.
CPC ......... *G03G 21/1647* (2013.01); *F16C 33/74* (2013.01); *G03G 15/0898* (2013.01)

(58) Field of Classification Search
CPC ........... G03G 15/0898; G03G 21/1647; G03G 2221/1648; F16C 33/20; F16C 33/74; F16C 33/201
See application file for complete search history.

(56) References Cited

U.S. PATENT DOCUMENTS

| | | | |
|---|---|---|---|
| 2010/0129110 A1* | 5/2010 | Kawaguchi | G03G 15/0898 399/104 |
| 2014/0254963 A1* | 9/2014 | Blair | F16C 17/028 384/115 |
| 2021/0364950 A1* | 11/2021 | Kawashima | G03G 15/0889 |

FOREIGN PATENT DOCUMENTS

| | | | |
|---|---|---|---|
| JP | 2010043666 A | * | 2/2010 |
| JP | 2019191452 A | | 10/2019 |

* cited by examiner

*Primary Examiner* — Sophia S Chen
(74) *Attorney, Agent, or Firm* — Cantor Colburn LLP

(57) ABSTRACT

A seal bearing includes: a bearing part configured to bear and hold a shaft such that the shaft is rotatable; and a seal part made of elastomer and combined with the bearing part. The seal part is joined to an end surface among two end surfaces of the bearing part. The two end surfaces are adjacent to a bearing surface of the bearing part in an axial direction.

14 Claims, 7 Drawing Sheets

SEAL BEARING AND IMAGE FORMING APPARATUS

CROSS-REFERENCE TO RELATED APPLICATIONS

The present invention claims priority under 35 U.S.C. § 119 to Japanese Patent Application No. 2021-045134 filed on Mar. 18, 2021, the entire contents of which being incorporated herein by reference.

BACKGROUND

Technological Field

The present invention relates to a seal bearing and an image forming apparatus.

Description of Related Art

A seal bearing, which is a combination of a bearing and a seal part, has often been used for a part (e.g., developing device of a laser printer) required to seal powder and transmit rotational power to the inside (for example, JP2019-191452A).

The seal bearing is required to have preferable characteristics with respect to the following three points: the sliding capability for allowing smooth rotation of a shaft; the sealing capability for sealing a sealing target; and the heat effect to the sealing target. More specifically, the seal bearing is required to be in close contact with the shaft in order to secure the sealing capability as an essential function. At the same time, the seal bearing is required to prevent abrasion or heat deformation of the shaft, which is caused by the load on the shaft due to the pressure to the contact surface. It is also necessary to prevent melting of the powder as a sealing target owing to the sliding heat.

Regarding this matter, JP2019-191452A uses a thermoplastic elastomer for the seal part. The elastic modulus of elastomer is small as compared with the elastic modulus of polytetrafluoroethylene (PTFE). Therefore, the seal part made of elastomer can retain a sufficient squeeze even though the seal part is not plastically deformed. Further, the pressure on the surface of the shaft can be reduced by forming the sealing part in an optimal shape in order to restrain abrasion or deformation of the shaft and heat effect to the sealing target.

SUMMARY

However, according to the invention disclosed in JP2019-191452A, the thickness reduction shape formed on the sealing side of the bearing for preventing surface sinks is filled with elastomer to increase thermal capacity in order to restrain effects of the sliding heat on the sealing target and to combine the seal part and the bearing. Further, the seal part and the bearing are fitted to each other with a locking shape. This complicates the shapes of the parts. This required complicated molds, which may increase cost or the size of the whole shape.

The present invention has been conceived in view of the above issues in the conventional art. An object of the present invention is to produce a compact and low-cost seal bearing by combining a bearing and a seal part made of elastomer.

To achieve at least one of the abovementioned objects, according to an aspect of the present invention, a seal bearing includes: a bearing part configured to bear and hold a shaft such that the shaft is rotatable; and a seal part made of elastomer and combined with the bearing part, wherein the seal part is joined to an end surface among two end surfaces of the bearing part, the two end surfaces being adjacent to a bearing surface of the bearing part in an axial direction.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, an embodiment of the present invention will be described with reference to the drawings. The following is an embodiment of the present invention and is not intended to limit the present invention.

Figure 1:
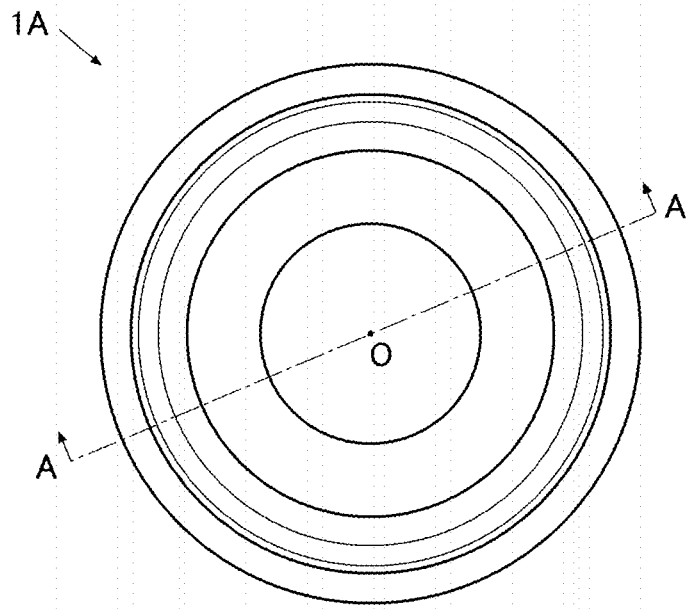
FIG. 1 is a top view of a resin sliding bearing according to an embodiment of the present invention.
Figure 2:
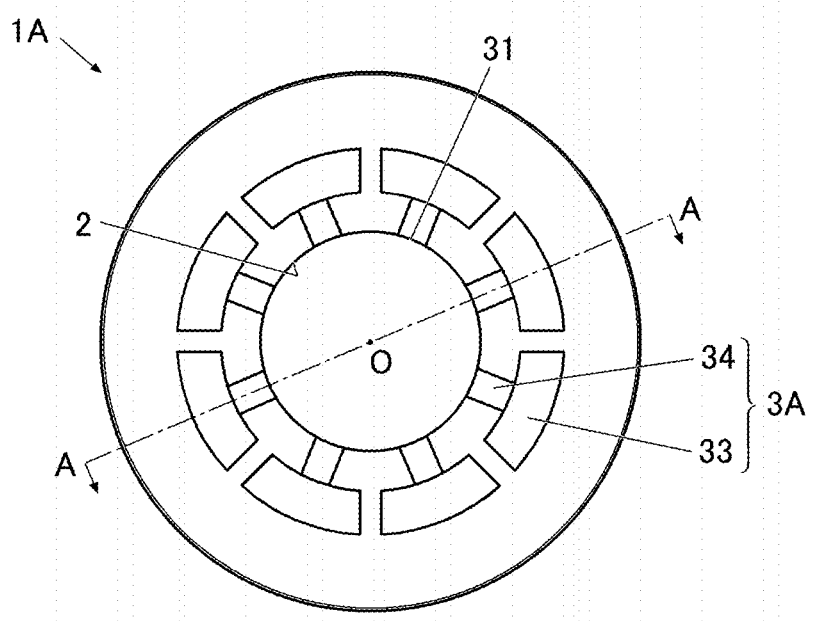
FIG. 2 is a bottom view of the resin sliding bearing according to the embodiment of the present invention.
Figure 3:
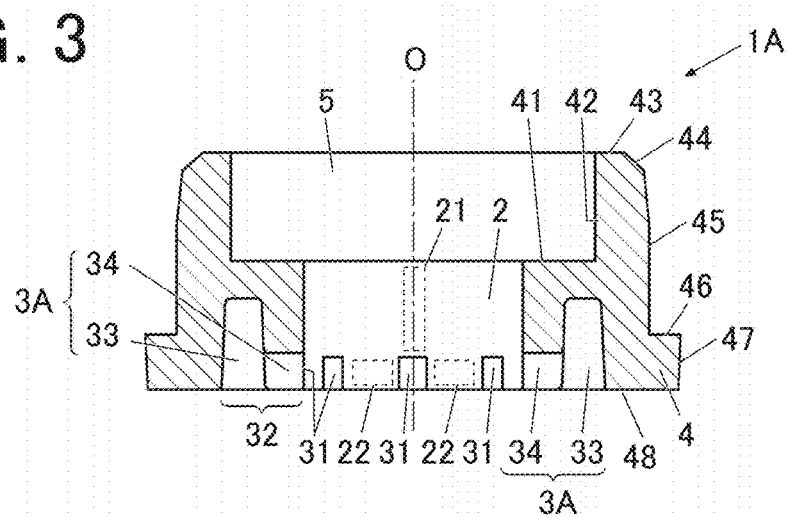
FIG. 3 is a cross section (corresponding to A-A in FIG. 1 and FIG. 2) of the resin sliding bearing including the central axis thereof according to the embodiment of the present invention.

FIG. 1 shows the top view of a resin sliding bearing 1A, and FIG. 2 shows the bottom view thereof according to this embodiment. FIG. 3 shows the cross section of the resin sliding bearing 1A including the central axis O. In the description, the side having a flange 4 is assumed to be the bottom, and the opposite side is assumed to be the top. However, this does not indicate the orientation of the sliding bearing fitted for use.

The innermost circumferential surface of the sliding bearing 1A is the bearing surface 2 for slidingly bearing a shaft, as shown in FIG. 1 to FIG. 3. The shaft to be held is inserted to the bearing surface 2 and borne by the sliding bearing 1A.

The sliding bearing 1A also has a hollow(s) 3A that communicates with the bearing surface 2 and a surface other than the bearing surface 2. The surfaces of the sliding bearing 1A other than the bearing surface 2 include: the lower end surface 41, the upper internal circumferential surface 42, the top end surface 43, the external taper surface 44, the external circumferential surface 45, the flange top surface 46, the flange external circumferential surface 47, and the bottom end surface 48.

Figure 4:
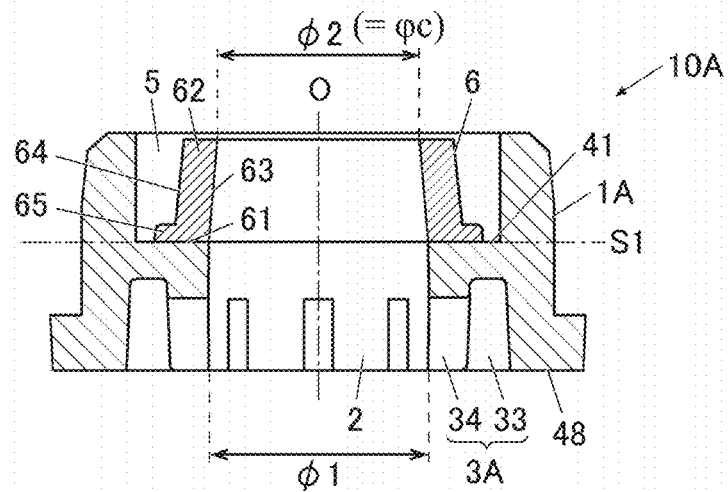
FIG. 4 is a cross section of a seal bearing that is the sliding bearing in FIG. 3 combined with a seal part.

The upper internal circumferential surface 42 and the bearing surface 2 have the same central axis. The diameter of the upper internal circumferential surface 42 is greater than the diameter of the bearing surface 2. The inside of the upper internal circumferential surface 42 is an internal space 5. As shown in FIG. 4, the internal space 5 is a space in which the seal part 6 is set. The seal part 6 may or may not be set in the internal space 5. The internal space 5 (upper internal circumferential surface 42) may not be formed no matter whether the seal part 6 is set (e.g., structure shown in FIG. 5).

In this embodiment, the hollow 3A communicates with the bearing surface 2 and the bottom end surface 48. The hollow 3A extends from a bearing-surface-side opening 31 to a bottom-side opening 32. The bearing-surface-side opening 31 connects to the bearing surface 2 of the hollow 3A.

The hollow 3A includes an internal space (hereinafter called "thickness reduction part") 33 for restraining surface sinks that may occur in molding resin into parts including the bearing surface 2. "Molding resin into parts including the bearing surface 2" refers to molding resin into the sliding bearing 1A shown in FIG. 1 to FIG. 3. The parts mentioned above do not include a part that is separately formed and combined with the sliding bearing 1A, such as the seal part 6 in FIG. 4.

The hollow 3A includes an airway 34 that connects the thickness reduction part 33 and the bearing surface 2. The airway 34 is cut open to the bottom end surface 48. That is, the bearing-surface-side opening 31 is cut open to the bottom end surface 48.

The thickness reduction part 33 is open to the bottom end surface 48.

In the above structure as an example, the bearing-surface-side opening 31 of the hollow 3A is adjacent to part of the bearing surface 2 (21, 22) in the axial direction and the circumferential direction of the bearing surface 2.

The sliding bearing 1A is connected in the circumferential direction of the bearing surface 2. This allows the sliding bearing 1A to retain a high level of rigidity. The bearing surface 2 is not deformed easily, and the sliding bearing 1A can hold the shaft accurately.

Multiple hollows 3A are formed in the circumferential direction of the bearing surface 2 in a dispersed manner. This allows the plain bearing 1A to have uniform cooling capability and hold the shaft in a balanced manner. It is therefore preferable that multiple hollows 3A be formed in a dispersed manner at regular intervals around the central axis O.

In the sliding bearing 1A, each hollow 3A may communicate with the other surface(s): the lower end surface 41 and/or the bottom end surface 48 that are adjacent to the bearing surface 2. This is because the external circumferential surface 45 is often blocked by the bearing holder 10 (FIG. 5).

In the sliding bearing 1A, each hollow 3A may communicate with the bottom end surface 48 among two end surfaces 41, 48 (the lower end surface 41 and the bottom end surface 48) that are adjacent to the bearing surface 2. As the hollows 3A do not pass through in the axis direction, the sliding bearing 1A can have the sealing capability.

Figure 5:
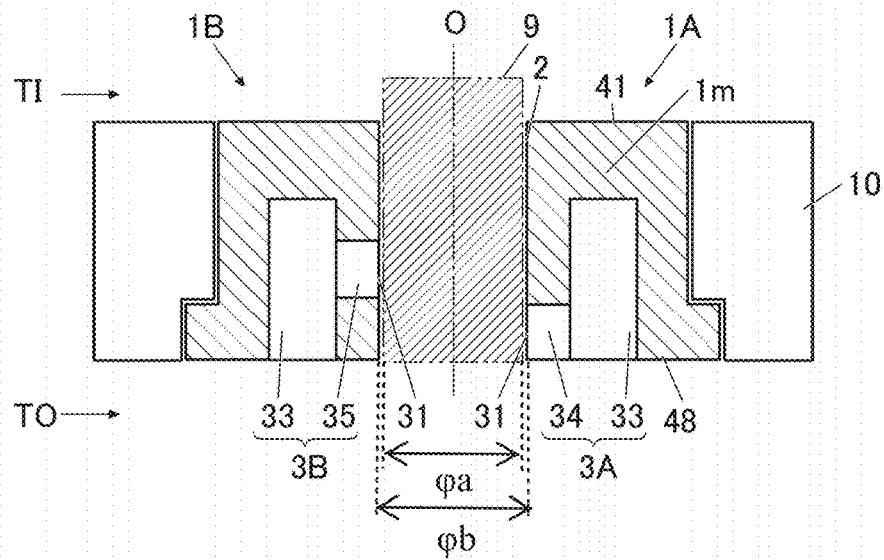
FIG. 5 is a cross section of the resin sliding bearing, the shaft, and the holder including the central axis according to the embodiment of the present invention, wherein the left half shows the case where an airway(s) (hollow) is a hole and the right half shows the case where the airway(s) (hollow) is a groove.
Figure 6:
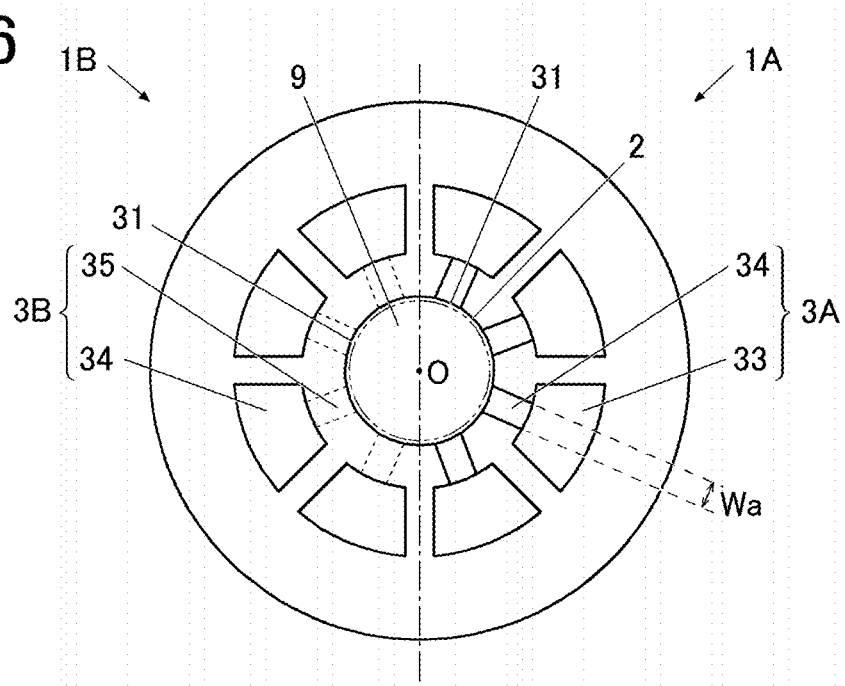
FIG. 6 is a bottom view of the resin sliding bearing and the shaft according to the embodiment of the present invention, wherein the left half shows the case where an airway(s) (hollow) is a hole and the right half shows the case where the airway(s) (hollow) is a groove.

The sliding bearing may have hollows (hollows 3B) having hole-shape airways 35 instead of the above-described airways 34, as shown in the left half of the cross section in FIG. 5 and the left half of the bottom view in FIG. 6 (sliding bearing 1B). However, the hollows 3A are easier to form than the hollows 3B. The entire hollows 3A can be formed with a single mold, whereas the entire hollows 3B need to be formed with divided molds.

The bearing surface 2 is made of resin material only. As shown in FIG. 5, the shaft 9 is inserted into the sliding bearing 1A. When the shaft 9 rotates, the external circumferential surface of the shaft 9 slides on the bearing surface 2. Thus, the sliding bearing 1A holds the shaft 9 such that the shaft 9 is rotatable. Sliding heat is generated between the external circumferential surface of the shaft 9 and the bearing surface 2.

Figure 7:
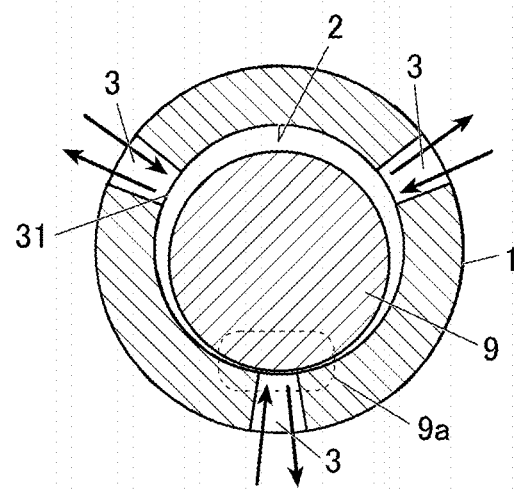
FIG. 7 is a schematic view to explain how the sliding heat is radiated by replacement of air in the sliding bearing according to the present invention.

As the hollows 3A communicate with the bearing surface 2 and the bottom end surface 48, the air near the bearing surface 2 is replaced through the open (not covered) bottom-surface-side opening 32. This facilitates radiation of sliding heat via air as a medium. As shown in the schematic view in FIG. 7, the radial load on the shaft 9 may become unbalanced and the heated part 9a may be concentrated on a certain area. As the resin sliding bearing 1 has the hollows 3 for air replacement, the air inside the sliding bearing 1 is replaced through the hollows 3. This facilitates radiation of sliding heat via air as a medium.

Thus, the resin sliding bearing 1 obtains the increased cooling capability while restraining heat deformation or other problems. The sliding bearing 1 can therefore retain a preferable rotational capability.

As described above, the bearing surface 2, which consists only of resin material, can retain the preferable rotational capability.

As part of each hollow 3 is the thickness reduction part 33, the sliding bearing 1 can restrain surface sinks in resin molding and retain the cooling capability when the bearing is in use.

Figure 8:
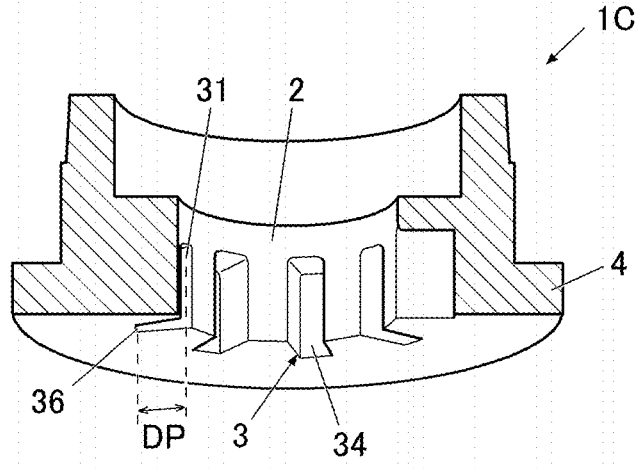
FIG. 8 is a cross-sectional perspective view of the resin sliding bearing according to another embodiment of the present invention.

The resin sliding bearing may not have parts corresponding to the thickness reduction parts 33, as shown by the resin sliding bearing 1C in FIG. 8. The resin sliding bearing 1C can also obtain the cooling capability.

The resin material of the sliding bearing 1 may be olefin resin (e.g., polypropylene (PP), polyethylene (PE)), polyacetal (POM), polyphenylenesulfide (PPS), or polyamide (PA).

The sliding bearing is applicable to an image forming apparatus, as described below.

The sliding bearing is applied to an image forming apparatus with an electrophotographic image former that develops electrostatic latent images using toner. Any of the above-described sliding bearings 1A, 1B, 1C is applied to a part where toner leakage should be prevented.

As shown in FIG. 5, the sliding bearing 1 is positioned at the boundaries between the toner space TI where the toner is placed and the external space TO so as to hold the shaft 9 that passes through the toner space TI and the external space TO. Among the end surfaces 41, 48 of the sliding bearing 1 (1A, 1B), the lower end surface 41, which is separate from the hollow 3 (3A, 3B) with a resin part 1m inbetween, is positioned at the toner space TI side. This prevents blockage of the hollows 3 (3A, 3B) with toner, which results in failure to replace air. The toner space TI is the space inside a device that carries and stirs toner. The toner space TI is, for example, the internal space of a developing device, a toner supplying device, or a toner ejecting device. The shaft 9 is a shaft of a screw that carries and/or stirs toner, for example. The shaft 9 receives power of a motor placed in the external space TO.

The bottom-side opening 32 is left open without a lid or the like, as described above. More specifically, the internal space of each hollow 3, which connects to the shaft 9 through the bearing-surface-side opening 31, communicates with the external space TO outside the hollow 3 through the bottom-surface-side opening 32 (opening at the surface side other than the bearing-surface 2 side) such that air can flow between the internal space of each hollow 3 and the external space TO. Such air replacement through the hollows 3 yields a cooling effect.

To increase the capability to seal toner, the sliding bearing 1 may be provided with the seal part 6, as shown in FIG. 4.

In using the seal bearing 10 (to be described later) that includes the seal part 6, the seal part 6 is placed at the toner space TI side. The outer diameter of the shaft 9 ($\varphi a$), the inner diameter of the bearing surface 2 ($\varphi b$), and the inner diameter of the seal part 6 ($\varphi c$, before being deformed) satisfy $\varphi c < \varphi a < \varphi b$. As $\varphi a$ is smaller than $\varphi b$, the shaft 9 can be inserted into the seal bearing 10. Further, as $\varphi a$ is greater than $\varphi c$, the seal part 6 can tighten the shaft 9 for sealing.

It is preferable that the resin material of the sliding bearing 1 be a material to which toner is less adhesive, in order to avoid adhesion of toner to the sliding bearing 1 and resulting problems, such as decrease in rotational capability. Preferably, the material may be olefin resin (PP, PE), for example.

Example Experiment 1

Herein, the example experiment 1 for checking the cooling effect is disclosed.

As shown in TABLE I, in the example experiment 1, seven kinds of $\varphi 6$ mm sliding bearings were created with polypropylene (PP) or polyacetal (POM). The seven kinds of sliding bearings include comparative examples that are made of PP and POM, respectively and that do not have the airways 34, 35 (number of airways: zero). As examples of the present invention, the following were created: three kinds of sliding bearings 1B that are made of PP and that have one hole airway, three hole airways, and eight hole airways, respectively; one kind of sliding bearing 1A that is made of PP and that has eight groove airways; and one kind of sliding bearing 1A that is made of POM and that has eight groove airways. Herein, the number of airways is equal to the number of hollows. For the examples having multiple airways, the hollows (3A, 3B) for air replacement were formed in a disperse manner at regular intervals in the circumferential direction.

The following were further created: two kinds of resin sliding bearings 1C that have eight groove airways, that do not have parts corresponding to the thickness reduction parts 33 as shown in FIG. 8, and that have different depths of grooves DP (20 μm, 10 μm) with respect to the bearing surface 2. As shown in FIG. 8, the depth DP of grooves from the bearing surface 2 is measured in the radial direction from the bearing-surface-side opening 31 to the end 36.

The shaft 9 with $\varphi 6$ mm and made of polycarbonate (PC) was inserted to the respective sliding bearings and rotated at 500 rotations per minute under 3N radial load. TABLE I shows the evaluation result of the deformation amount of the respective bearings.

TABLE I

| BEARING MATERIAL | | PP | | | | | | | POM | |
|---|---|---|---|---|---|---|---|---|---|---|
| AIRWAY | NUMBER | 0 | 1 | 3 | 8 | 8 | 8 | 8 | 0 | 8 |
| | TYPE | — | HOLE | HOLE | HOLE | GROOVE | GROOVE | GROOVE | — | GROOVE |
| | DEPTH DP | — | — | — | — | — | 20 μm | 10 μm | — | — |
| EVALUATION RESULT | DEFORMATION AMOUNT | 15 μm | 10 μm | 2 μm | 2 μm | 2 μm | 2 μm | 5 μm | 15 μm | 2 μm |

Deformation of the bearing is caused by sliding heat and load. The greater the sliding heat is, the greater the deformation amount is. When the sliding heat exceeds a certain level, the surface of the bearing melts. In the example experiment 1, the deformation amount was used as an index of sliding heat for comparison because it is difficult to directly measure the temperature.

PP and POM were selected and evaluated because of their high abrasion resistance as compared with other general-purpose resins.

As shown in TABLE I, the deformation amounts of the present invention examples were less than the deformation amounts of the comparative examples. This experiment showed that the bearings made of PP and POM both obtained a cooling effect by having the hollows (3A, 3B) for air replacement.

The experiment further showed that the cooling effect increased with a greater number of hollows (3A, 3B) for air replacement and that three or more hollows yielded sufficient cooling effect.

As for the types of airways, the hole-shape airways 35 and the groove-shape airways 34 both yielded a cooling effect regardless of the difference in shape. Therefore, it turned out that the sliding bearing 1A with the groove-shape airways 34, which are easy to form, compares favorably in cooling effects.

As for the depth DP of each hollow 3 from the bearing surface 2, it turned out that the depth DP equal to or greater than 20 μm yielded sufficient cooling effects. When the depth DP is around 20 μm, the sliding bearing 1 may have groove-shape hollows 3 without the thickness reduction part 33, or the sliding bearing 1 may have both the groove-shape hollows 3 and the thickness reduction part 33 that are separate from each other. The hollows 3 with the depth DP of around 20 μm would look much shallower than the hollows shown in FIG. 8.

Example Experiment 2

The example experiment 2 for checking the rotational capability is disclosed.

Figure 9:
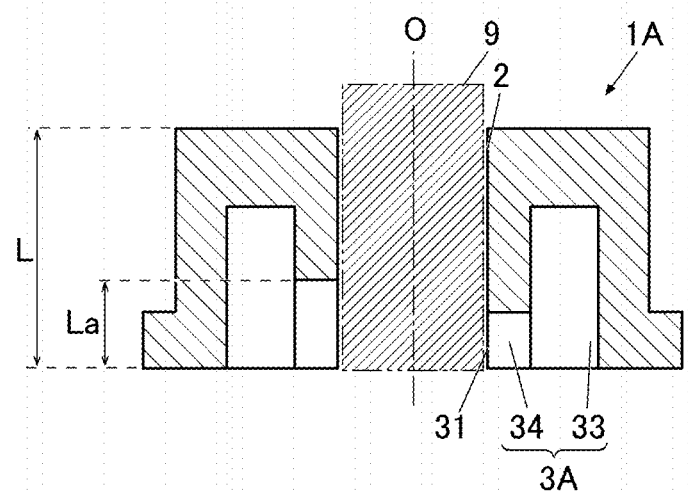
FIG. 9 is a cross section of the sliding bearing including the central axis of the shaft for explaining an example experiment 2.
Figure 10:
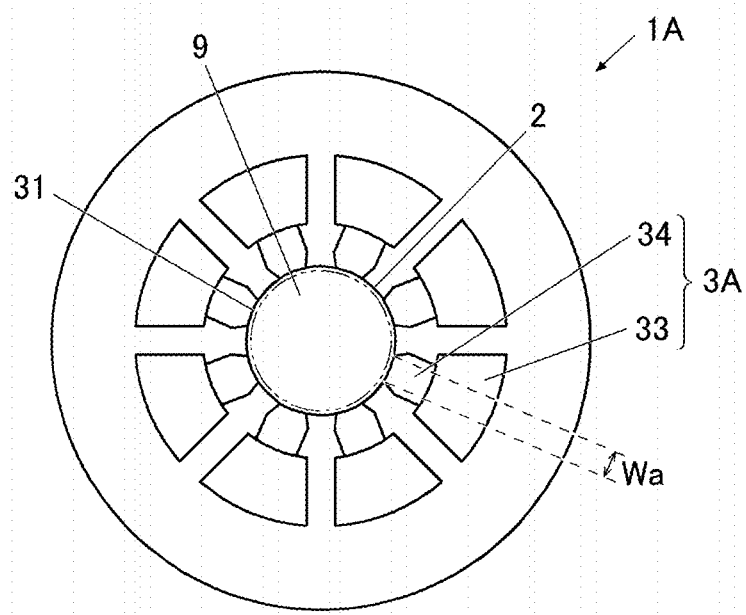
FIG. 10 is a bottom view of the sliding bearing having airways (hollows) that have narrowed openings at the bearing surface side.

In the example experiment 2, the sliding bearings 1A, which have groove-type airways 34, were created as with the example experiment 1. In the example experiment 2, seven kinds of sliding bearings 1A were created by changing the opening length La (see FIG. 9), the opening width Wa (see FIG. 6 and FIG. 10), and the edge shape of the openings. The edge shapes of the openings were either a straight type or a narrowing type. As shown in FIG. 6, the straight type airway 34 has a uniform straight-shaped section. As shown in FIG. 10, the narrowing type airway 34 is narrowed at the bearing-surface-side opening 31. The internal lateral surface of each hollow 3 and the bearing surface 2 constitute the edge of the bearing-surface-side opening 31. For the straight type, the angle between the internal lateral surface of the hollow 3 and the bearing surface 2 is the right angle. For the narrowing type, the angle between the internal lateral surface of the hollow 3 and the bearing surface 2 is an acute angle.

The created sliding bearings 1A have the following common features: (i) eight airways, (ii) made of polypropylene (PP), (iii) for φ6 mm, and (iv) the bearing length L of the sliding bearing 1A is 3 mm.

As with the example experiment 1, the number of airways is equal to the number of hollows. The eight hollows 3A for air replacement were formed in a dispersed manner at regular intervals in the circumferential direction, as shown in FIG. 2, FIG. 6, and FIG. 10.

The shaft 9 has φ6 mm and is made of polycarbonate (PC). The shaft 9 was inserted to the respective sliding bearings and rotated at 500 rotations per minute under 3N radial load. TABLE II shows the result of evaluating the deformation amounts of the respective bearings, as with the example experiment 1. TABLE II also shows the result of detecting axial shifts.

TABLE II

| BEARING MATERIAL | | PP | | | | | | |
|---|---|---|---|---|---|---|---|---|
| CHECK POINT | | EFFECT OF OPENING WIDTH | | | | OPENING LENGTH/ OPENING AREA | | EDGE SHARPNESS |
| AIRWAY | EDGE SHAPE OF OPENING | RIGHT ANGLE | RIGHT ANGLE | RIGHT ANGLE | RIGHT ANGLE | RIGHT ANGLE | RIGHT ANGLE | ACUTE ANGLE |
| | OPENING LENGTH | 1 | 1 | 1 | 1 | 2 | 2 | 1 |
| | OPENING WIDTH | 0.1 | 0.5 | 0.7 | 0.9 | 0.15 | 0.6 | 0.5 |
| | OPENING AREA | 0.1 | 0.5 | 0.7 | 0.9 | 0.3 | 1.2 | 0.5 |
| | OPENING WIDTH (%) | 0.04 | 0.21 | 0.30 | 0.38 | 0.06 | 0.25 | 0.21 |
| EVALUATION RESULT | DEFORMATION AMOUNT | 2 μm | 2 μm | 2 μm | — | 2 μm | 2 μm | MELTED |
| | SHAFT SHIFT | ○ | ○ | ○ | Δ | ○ | ○ | — |

Capability to hold the shaft is expected to decrease with a longer opening length La at the bearing surface 2, a wider opening width Wa, and a wider opening area.

It turned out that the axial shift was slightly conspicuous when the opening width Wa (total of the opening widths Wa) accounted for approximately 40% of the entire circumference of the bearing surface 2. Therefore, it is preferable that the ratio of lacking parts of the bearing surface 2 (lacking parts because of the bearing-surface-side openings 31) to the entire circumference of the bearing surface 2 in the circumferential direction is equal to 30% or less. More specifically, the bearing can slidingly support and bear the shaft while restraining shift of the shaft when the opening width Wa at the bearing surface 2 is designed such that the total of the opening width Wa accounts for 30% or less of the entire circumference of the bearing surface 2.

It also turned out that the cooling effect of the hollows 3 is not affected by the opening length or the opening area (opening length×opening width).

On the other hand, it turned out that the bearing surface 2 melts when the opening edges at the bearing surface 2 have an acute angle. This is supposed to be due to a locally high surface pressure caused by the acute edges of the openings at the bearing surface 2. It is therefore preferable that the angle between the internal lateral surface of each hollow 3 and the bearing surface 2, which form an edge of each bearing-surface-side opening 31, be the right angle or an obtuse angle.

As described above, the resin sliding bearing according to this embodiment can obtain the cooling effect with the hollows 3 (3A, 3B) that communicate with the bearing surface 2 for air replacement. The cooling effect restrains deterioration and deformation of resin on or near the bearing surface 2. Further, parts 21, 22 of the bearing surface 2, which are adjacent to the bearing-surface-side openings 31 of the respective hollows 3 in the axial and circumferential directions, are secured. This allows the bearing to have high rotational capability.

Further, compact sliding bearings with sealing capability can be produced at lower cost.

[Overview of Seal Bearing]

Next, the overview of the seal bearing is described.

Figure 11:
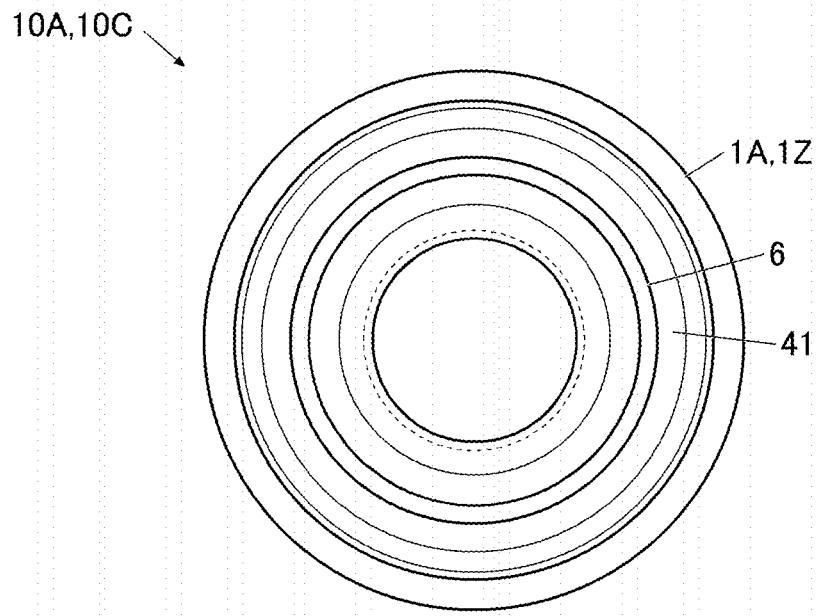
FIG. 11 is a top view of the seal bearing shown in FIG. 4 and FIG. 14.

The seal bearing 10A shown in FIG. 4 includes the above-described resin sliding bearing 1A as a bearing part. FIG. 11 shows the top view of the seal bearing 10A. The seal bearing 10A is a combination of: the bearing part 1A that rotatably bears and holds the shaft 9; and the seal part 6 made of elastomer.

The seal part 6 is joined to the lower end surface 41 among two surfaces (the lower end surface 41 and the bottom end surface 48) that are adjacent to the bearing surface 2 of the bearing part 1A in the axial direction. The lower end surface (end surface) 41, to which the seal part 6 is joined, is the end surface opposite the bottom end surface (end surface) 48 toward which the hollows 3A are open.

The seal part 6 and the bearing part 1A can be joined with a glue or welded. In particular, welding the seal part 6 to the bearing part 1A in insert molding or double molding can eliminate the need for another joint process, thereby improving production efficiency. Further, by performing the molding and welding at the same time, the seal part 6 can be securely joined to the bearing part 1A.

The seal part 6 is welded only to the lower-part surface 41, thereby being integrated with the bearing part 1A. As a complicated metal mold is not required for fixing the seal part 6 to the bearing part 1A, the seal bearing 10A can be produced at low cost. Further, as a complicated or large bearing part 1A is not required to fix the seal part 6 to the bearing part 1A, the seal bearing 10A can be compact.

The whole seal part 6 is positioned opposite the bearing surface 2 with respect to a plane S1 that includes the lower end surface 41. Therefore, the seal bearing 10A does not require a hollow(s) on or near the bearing surface 2 into which the seal part 6 is fitted. This allows a compact seal bearing 10A. The bearing part to be applied to the seal bearing 10A may be a simple cylindrical sliding bearing that does not have a hollow(s) 3 for air replacement. Such a seal bearing 10A can be further compact.

The seal part 6 has a cylindrical shape and is positioned to have the same axis with the bearing surface 2.

One end surface of the seal part 6 in the axial direction is the joint surface 61. The joint surface 61 of the seal part 6 is joined to the lower end surface 41 of the bearing part 1A. The seal part 6 has a cylindrical shape that extends from the joint surface 61 in the axial direction (upward direction in FIG. 4). The end portion of the seal part 6 opposite the joint surface 61 is the end portion 62. The end portion 62 is a free end, whereas the joint surface 61 is a fixed end.

The inner diameter of the bearing surface 2 ($\varphi 1$) is equal to the inner diameter ($\varphi 1$) of the seal part 6 at the joint surface 61. Therefore, the bearing surface 2 and the internal circumferential surface 63 of the seal part 6 are connected without steps. The diameter of the end portion of the seal part 6 ($\varphi 2$) is smaller than $\varphi 1$ ($\varphi 1 > \varphi 2$). Therefore, the end portion 62 is pressingly in contact with the outer circumference of the shaft 9 borne and held by the bearing part (1A) for sealing. As the seal part 6 is made of elastomer having elasticity, the end portion 62 bents outwards and pressingly sticks to the outer circumference of the shaft 9 for sealing.

The seal part 6 is shaped such that the inner diameter thereof gradually decreases from $\varphi 1$ to $\varphi 2$ in the axial direction. More specifically, the seal part 6 is shaped such that the inner diameter thereof gradually decreases from the joint surface 61 toward the end portion 62. In this embodiment, the internal circumferential surface 63 of the seal part 6 has a tapering shape and narrows from the joint surface 61 toward the end portion 62. The external circumferential surface 64 of the seal part 6 also has a tapering shape and narrows from the joint surface 61 toward the end portion 62. The seal part 6, however, has a flange 65 at the joint surface 61 side.

As the inner diameter of the seal part 6 gradually decreases from $\varphi 1$ to $\varphi 2$ along the axial direction, the end portion 62 can appropriately tighten the outer circumferential surface of the shaft 9 to secure a high sealing capability. On the other hand, the seal part 6 does not excessively tighten the shaft 9 to keep an appropriate rotational capability for rotatably bearing and holding the shaft 9.

Assuming that the end portion 62 is the top and the joint surface 61 is the bottom, the external shape of the seal part 6 is asymmetrical in the top-bottom direction.

Such an external shape can prevent misorientation of the seal part 6 (insertion of the seal part 6 upside-down) when the seal part 6 molded beforehand is inserted into the metal mold of the bearing part 1A in inserting molding. The seal part 6 in this embodiment has the flange 65, which makes a conspicuous asymmetry. The flange 65 also widens the area of the joint surface 61 so that the seal part 6 can be joined to the bearing part 1A further securely.

Figure 12:
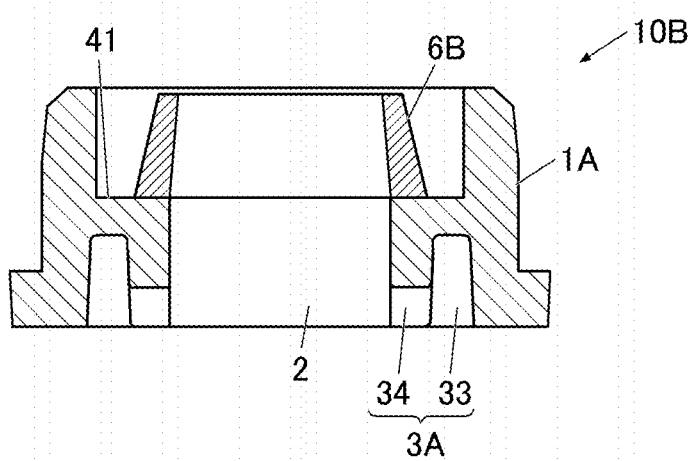
FIG. 12 is a cross section of the seal bearing including the central axis according to another embodiment.
Figure 13:
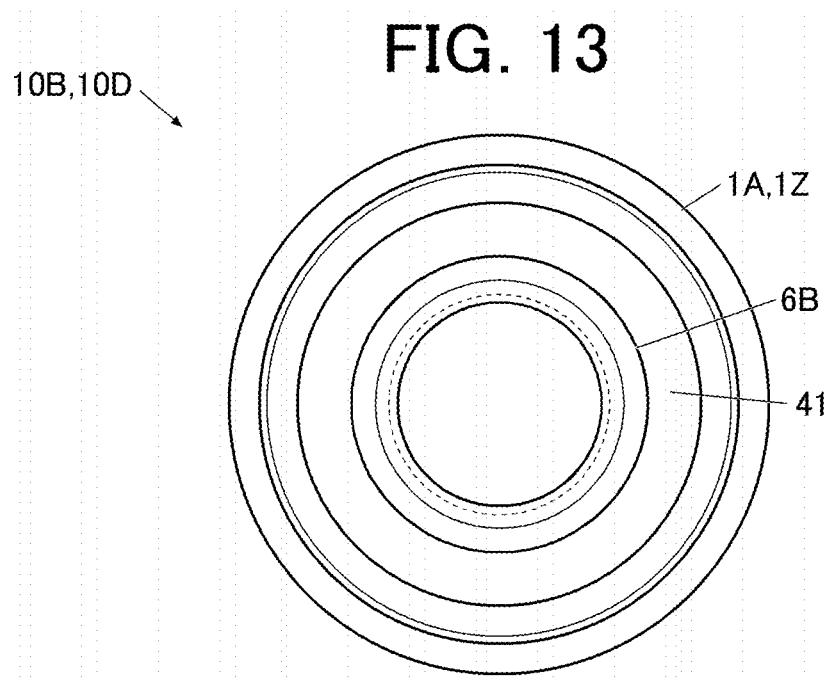
FIG. 13 is a top view of the seal bearing shown in FIG. 12 and FIG. 15.

As described above, the seal part 6 is made thinner at the end portion 62 than at the joint surface 61 in order to increase the area of the joint surface 61 while allowing the end portion 62 to be appropriately deformable. For example, as shown by the seal bearing 10B shown in FIG. 12 and FIG. 13, the seal part 6B may not have the flange 65. In the case, the seal part 6 may also be made thinner at the end portion 62 than at the joint surface 61.

Figure 14:
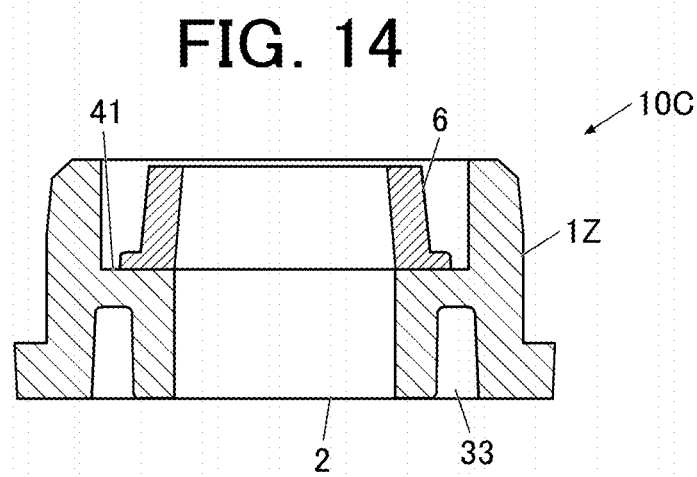
FIG. 14 is a cross section of the seal bearing including the central axis according to another embodiment.
Figure 15:
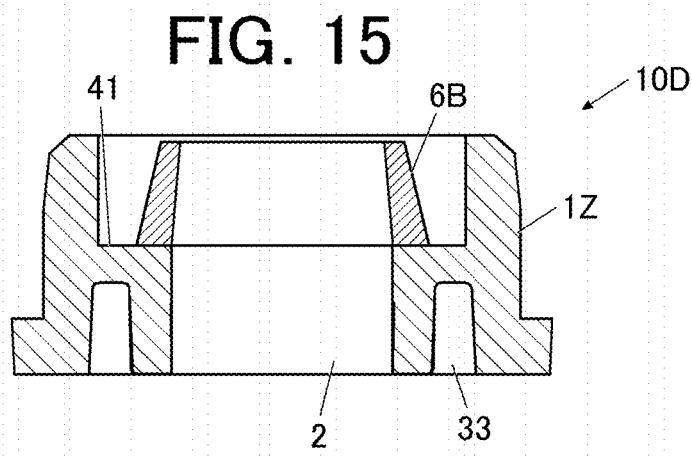
FIG. 15 is a cross section of the seal bearing including the central axis according to another embodiment.

The seal part 6 may or may not be combined with the sliding bearing 1 (1A, 1B, 1C) having the hollows 3 for air replacement. As shown by the seal bearings 10C and 10D in FIG. 14 and FIG. 15, the seal part 6 (6B) may be joined to the resin sliding bearing 1Z without the hollows 3 for air replacement. The thickness reduction part 33 shown in FIG. 14 and FIG. 15 may also be omitted to make the bearing further compact.

Example Experiment 3

The example experiment 3 for checking weldability between the seal part 6 and the bearing part 1 is disclosed.

As described above, as a method for directly joining the seal part 6 to the lower end surface 41 of the bearing part 1, the seal part 6 may be welded by insert molding or double welding.

In this example experiment, insert molding was performed. More specifically, the seal bearing 10 molded beforehand was inserted to a metal mold, and the material of the bearing part 1 was injected into the mold (injection molding) to create the seal bearing 10. The mold was then opened to check whether the seal part 6 was joined to the bearing part 1.

TABLE III shows combinations of the material of the seal part 6 (seven kinds of elastomer and PTFE) and the material of the bearing part 1. TABLE III also shows the result of checking whether the seal part 6 was joined to the bearing part 1 in the respective combinations. TABLE III further shows difference in solubility parameters (SP values, unit: cal/ml) in the respective combinations. PP and POM were selected and evaluated as the material of the bearing part 1. PP and POM are known to have high abrasion resistance among general-purpose resins.

In TABLE III, "TPE" refers to thermoplastic elastomer.

TABLE III

| BEARING MATERIAL | SEAL PART MATERIAL | DIFFERENCE IN SP VALUES | JOINED? |
|---|---|---|---|
| PP | POLYSTYRENE TPE | 0.4 | ○ |
|  | OLEFIN TPE | 0.4 | ○ |
|  | POLYESTER TPE | 2.4 | x |
|  | POLYURETHANE TPE | 1.9 | x |
|  | ACRYLIC TPE | 2.4 | x |
|  | PTFE | 1.9 | x |
| POM | POLYSTYRENE TPE | 2.7 | x |
|  | OLEFIN TPE | 2.7 | x |
|  | POLYESTER TPE | 0.7 | ○ |
|  | POLYURETHANE TPE | 1.2 | ○ |
|  | ACRYLIC TPE | 0.7 | ○ |
|  | PTFE | 5 | x |

As shown in TABLE III, the experiment showed that the combinations of materials between which the solubility parameters are different by 1 (cal/ml) or less were welded and joined.

It is known that a solution and a solvent that have close solubility parameters are highly compatible (soluble). Therefore, according to the result of the experiment, it is considered that the melted resin functioned like a solvent in molding and facilitated welding.

Example Experiment 4

Next, the example experiment 4 for checking whether toner is adhesive to the seal part 6 is disclosed.

When the seal bearing 10 is applied to a developing device for sealing toner, it is preferable that the material of the seal part 6 to which the toner is not adhesive be selected, in order to avoid adhesion and accumulation of toner on the seal part 6 and generation of heat at the area where the toner is adhered/accumulated.

TABLE IV shows typical materials of the seal part, solubility parameters (SP values) of PP and POM (shown unit: cal/ml), and the result of checking toner adhesion property. The materials used in the example experiment 4 are the same as the materials of the seal part and bearing part shown in TABLE III.

Toner adhesion property was evaluated as follows: prepare 10-mm test pieces; heat to 100° C. while pressing toner against the pieces with 10N load; and check whether the toner was adhered to the surface of the pieces.

TABLE IV

| SEAL PART MATERIAL | SP VALUE | TONER ADHESION |
|---|---|---|
| PP | 8.1 | ○ NOT ADHERED |
| POM | 11.2 | x ADHERED |
| POLYSTYRENE TPE | 8.5 | ○ NOT ADHERED |
| OLEFIN TPE | 8.5 | ○ NOT ADHERED |
| POLYESTER TPE | 10.5 | x ADHERED |
| POLYURETHANE TPE | 10 | x ADHERED |
| ACRYLIC TPE | 10.5 | x ADHERED |
| PTFE | 6.2 | ○ NOT ADHERED |

As shown in TABLE IV, it turned out that toner is adhesive to the samples having the solubility parameter of around 10 cal/ml.

The solubility parameters of materials constituting toner are around 10.1 to 10.5 cal/ml. Therefore, it is considered that the material with a solubility parameter close to the solubility parameter of toner was highly compatible with toner, which resulted in toner adhesion.

Therefore, it is preferable that the solubility parameter of the seal part be equal to or less than 9 cal/ml.

It is further preferable that the combination of the materials be polypropylene (PP) and elastomer that contains PP as matrix resin. Polypropylene is a general-purpose resin that is easily available at low prices and is known to have a relatively high level of abrasion-resistance. The elastomer that contains PP as matrix resin is "polystyrene TPE" and "olefin TPE" in TABLEs. The above combination has no problem with respect to the weldability and toner adhesion property, as shown by the results of the example experiments 3, 4.

Example Experiment 5

Next, the example experiment 5 for checking abrasion of the shaft with different shapes and different levels of hardness of the seal part 6 is disclosed.

To balance the sealing capability and the heat effect by the sliding parts (abrasion of the shaft, heat deformation, and effect on toner), the surface pressure of the seal part 6 on the shaft 9 should be optimized by designing such a seal part 6 that has an appropriate level of hardness and shape.

The detailed experiment is as follows.

Various seal bearings 10 for φ6 mm were created by varying levels of hardness and shapes of the seal part 6 (seal thickness and seal squeeze). A φ6 mm polycarbonate (PC) shaft 9 was inserted to the respective created samples of the seal bearing 10 and rotated at 500 rotations per minute. Abrasion of the shaft was evaluated.

TABLE V shows (i) combinations of the hardness and shape (seal thickness and seal squeeze) of the seal part 6 and (ii) results of evaluating whether the shaft was abraded.

Figure 16:
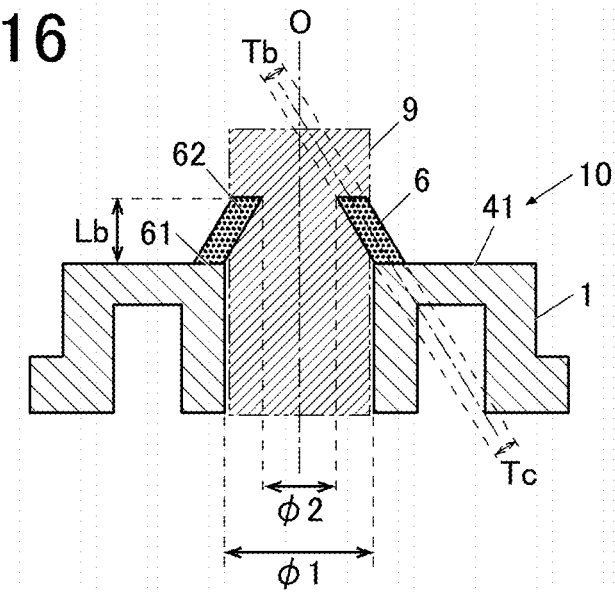
FIG. 16 is a cross section of the seal bearing including the central axis of the shaft for explaining an example experiment 5.

The seal length Lb in FIG. 16 was 3 mm. The inner diameter of the seal part (φ2) was set to 5.7 mm, 5.4 mm, and 4.8 mm with respect to the shaft diameter φ1=6 mm so that the seal squeeze accounted for 5%, 10%, and 20% of the inner diameter of the bearing surface 2 (φ1). As shown in FIG. 16, when the shaft 9 is not inserted in the bearing part 1 and the seal part 6 receives no load, the end portion 62 is inside the position of the inner diameter (position of φ1) of the bearing surface 2. The seal squeeze indicates how much the end portion 62 enters inside the position of the inner diameter of the shaft 9 (position of φ1). More specifically, the seal squeeze is the ratio of the length of the end portion 62 entering inside the position of the inner diameter in the radial direction to φ1.

In this experiment, the seal material 6 was made of styrene elastomer.

The hardness of the seal part 6 was set to three levels: A50, A70, and A90.

The thickness Tb of the end portion 62 of the seal part 6 was set to three sizes: 1 mm, 2 mm, and 3 mm.

Figure 17:
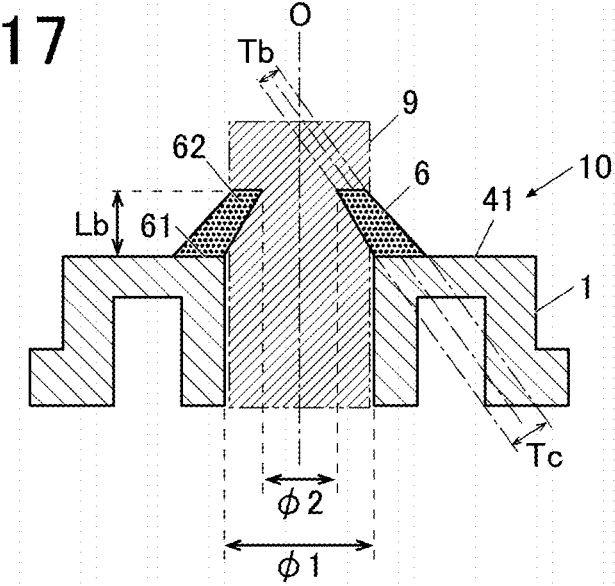
FIG. 17 is a cross section of the seal bearing including the central axis of the shaft for explaining the example experiment 5.

The samples had a uniform thickness from the joint surface 61 (thickness Tc) to the end portion 62 (thickness Tb), as shown in FIG. 16. However, the rightmost sample in TABLE V had such a thickness that gradually decreases from the joint surface 61 (Tc=3 mm) to the end portion 62 (Tb=2 mm), as shown in FIG. 17.

TABLE V

|  | HARDNESS OF ELASTOMER | | | SEAL THICKNESS | | |
| --- | --- | --- | --- | --- | --- | --- |
| SEAL RIGIDITY | A50 | A70 | A90 | A70 | A70 | A70 |
| SEAL THICKNESS (mm) | 2 | 2 | 2 | 1 | 2 | 3 |
| SEAL SQUEEZE (%) | 10 | 10 | 10 | 10 | 10 | 10 |
| SHAFT ABRASION (EXPERIMENT) | NOT ABRADED | NOT ABRADED | ABRADED | NOT ABRADED | NOT ABRADED | ABRADED |

|  | SEAL SQUEEZE (%) | | | DIFFERENT SEAL SHAPE | |
| --- | --- | --- | --- | --- | --- |
| SEAL RIGIDITY | A70 | A70 | A70 | A70 | A70 |
| SEAL THICKNESS (mm) | 2 | 2 | 2 | 3 | 2-3 |
| SEAL SQUEEZE (%) | 5 | 10 | 20 | 10 | 10 |
| SHAFT ABRASION (EXPERIMENT) | NOT ABRADED | NOT ABRADED | ABRADED | ABRADED | NOT ABRADED |

As shown in TABLE V, the experiment showed that the greater the hardness is, the greater the surface pressure of the seal part 6 on the shaft 9 is and that the shaft starts to be abraded when the hardness exceeds A90. It is therefore preferable that the hardness of the seal part 6 be equal to or less than A70.

The experiment also showed that the thicker the seal thickness (Tb) is, the greater the surface pressure on the shaft 9 by the seal part 6 is and that the shaft starts to be abraded when the seal thickness (Tb) is equal to or greater than 3 mm.

The abrasion of the shaft 9 does not occur when the thickness Tb of the end portion 62, which is in contact with the shaft 9, is equal to or less than 2 mm. Further, as shown by the rightmost sample in TABLE V, it turned out that the shaft is not abraded when the thickness Tb of the end portion 62 is equal to or less than 2 mm even when the thickness Tc at the joint surface 61 is equal to or greater than 3 mm. In consideration of the above findings, it is preferable that the thickness Tb of the end portion 62 be designed to be equal to or less than 2 mm.

When the shape of the seal part 6 is designed such that the thickness of the seal part 6 gradually decreases from the thickness Tc at the joint surface 61 to the thickness Tb at the end portion 62 as shown in FIG. 17, the seal part 6 can be joined to the bearing part 1 on a wider joint area while securing a sufficient seal squeeze.

Further, it is preferable that the seal squeeze (how much the end part is narrowed with respect to the shaft diameter) be equal to or less than 10% in order to restrain abrasion of the shaft, as shown in TABLE V.

As described above, the seal bearing in this embodiment has favorable characteristics with respect to the sliding capability for smoothly rotating the shaft; the sealing capability for sealing a target; and the heat effect on the target. The seal bearing in this embodiment also can be made compact at low cost.

The above embodiment is an example for explaining the present invention. The components of the embodiment can be appropriately changed, reduced, or new components may be added without departing from the scope of the present invention.

Although the seal part 6 can be joined to the bearing part 1 by welding in the above embodiment, the joining may be done by other methods. The seal part 6 and the bearing part 1 may be glued with a glue. In order to increase weldability and adhesiveness, the joint surface of the molded seal part 6 may be treated with a silane coupling agent or may be roughened.

The seal part 6 may be formed in various shapes other than the shape shown in the above embodiment. The seal part 6 can be joined to the bearing part 1 with sufficient joining strength by joining the joint surface 61 of the seal part 6 to the lower end surface 41 of the bearing part 1. Therefore, the seal part 6 can be designed highly flexibly in various shapes.

Regardless of the above embodiment, the bearing part 1 may have a tapering surface (FIG. 18) or a step (FIG. 19) within the area where the seal part 6 is joined to the bearing part 1. This can increase the joint area between the seal part 6 and the bearing part 1 without changing the outer diameter of the seal bearing 10.

Figure 18:
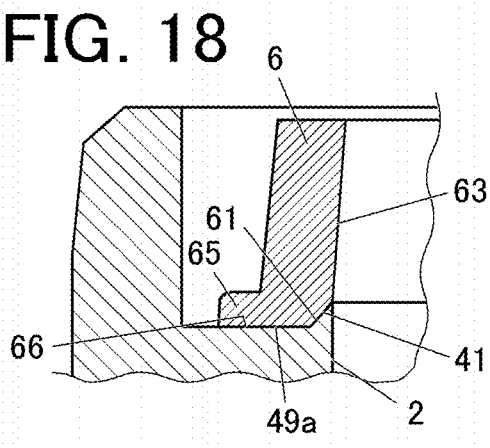
FIG. 18 is an enlarged cross section of the part at which the bearing part is joined to the seal part according to another embodiment.
Figure 19:
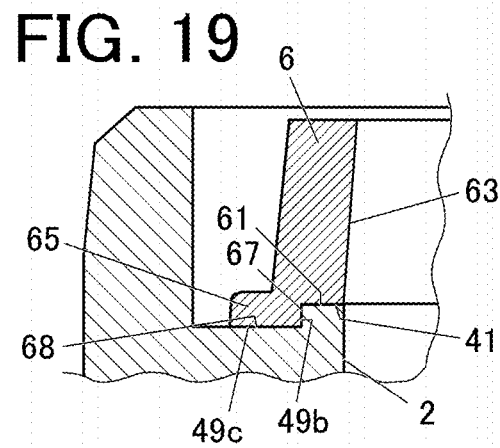
FIG. 19 is an enlarged cross section of the part at which the bearing part is joined to the seal part according to another embodiment.

The joint surface 61 is a surface to be joined to the lower end surface 41, which is adjacent to the bearing surface 2 of the bearing part 1 in the axial direction. As shown in FIG. 18, the joint surface 61 may be inclined. Further, as shown in FIG. 18 and FIG. 19, the seal part 6 may also be joined to the surfaces 49a, 49b that are adjacent to the lower end surface 41 and that are in different directions from the lower-end surface 41. The joint surfaces 66, 67 of the seal part 6 are joined to the surfaces 49a, 49b, respectively. This allows the seal bearing 10 to have joint surfaces in different directions. This further allows the seal bearing 10 to have increased joint areas between the seal part 6 and the bearing part 1 in a small space. The seal part 6 may also be joined to the surface 49c that is separate from the lower end surface 41. The surface 49c is joined to the joint surface 68 of the seal part 6. This allows the seal bearing 10 to have increased joint areas between the seal part 6 and the bearing part 1.

Although embodiments of the present invention have been described and illustrated in detail, the disclosed embodiments are made for purposes of illustration and example only and not limitation. The scope of the present invention should be interpreted by terms of the appended claims.

What is claimed is:

1. A seal bearing comprising:
   a bearing part configured to bear and hold a shaft such that the shaft is rotatable; and
   a seal part made of elastomer and combined with the bearing part, wherein
   the seal part is joined to an end surface among two end surfaces of the bearing part, the two end surfaces being adjacent to a bearing surface of the bearing part in an axial direction;
   wherein
   the bearing part is made of resin,
   a difference between a solubility parameter of the bearing part and a solubility parameter of the seal part is equal to or less than 1 cal/ml, and
   the seal part is welded to the end surface.

2. The seal bearing according to claim 1, wherein the seal part is also joined to a surface of the bearing part that is adjacent to the end surface and that faces in a different direction from the end surface.

3. The seal bearing according to claim 1, wherein a solubility parameter of the seal part is equal to or less than 9 cal/ml.

4. The seal bearing according to claim 1, wherein
   the bearing part is made of polypropylene, and
   the seal part is made of elastomer that contains polypropylene as matrix resin.

5. The seal bearing according to claim 4, wherein the seal part is made of polystyrene thermoplastic elastomer or olefin thermoplastic elastomer.

6. The seal bearing according to claim 1, wherein the seal part has a level of hardness equal to or less than A70.

7. The seal bearing according to claim 1, wherein
   the seal part includes an end portion that is opposite a joint end surface of the seal part joined to the bearing part and that is in contact with the shaft borne and held by the bearing part, and
   the end portion of the seal part is equal to or less than 2 millimeters in thickness.

8. The seal bearing according to claim 1, wherein
   the seal part includes an end portion that is opposite a joint end surface of the seal part joined to the bearing part and that is in contact with the shaft borne and held by the bearing part, and
   the seal part is thinner at the end portion than at the joint end surface.

9. The seal bearing according to claim 1, wherein
   the seal part includes an end portion that is opposite a joint end surface of the seal part joined to the bearing part and that is in contact with the shaft borne and held by the bearing part, and
   when the bearing part does not bear the shaft and the seal part receives no load, the end portion of the sealing part enters inside a position of an inner diameter of the bearing surface such that a ratio of a length of the end portion entering inside the position of the inner diameter in a radial direction to the inner diameter is equal to or less than 10%.

10. The seal bearing according to claim 1, wherein
    the seal part includes an end portion that is opposite a joint end surface of the seal part joined to the bearing part and that is in contact with the shaft borne by the bearing part, and
    the seal part is shaped such that an inner diameter of the seal part changes along an axial direction so as to gradually decrease from the joint end surface toward the end portion.

11. The seal bearing according to claim 10, wherein
    when the end portion of the seal part is assumed to be a top and the joint end surface of the seal part is assumed to be a bottom, an external shape of the seal part is asymmetrical in a top-bottom direction.

12. The seal bearing according to claim 1, wherein the bearing part is a sliding bearing that bears the shaft on an internal circumferential surface as the bearing surface.

13. The seal bearing according to claim 12, wherein
    the bearing part includes a hollow that communicates with the bearing surface through to a surface different from the bearing surface.

14. An image forming apparatus comprising:
    an electrophotographic image former that develops an electrostatic latent image with toner; and
    the seal bearing according to claim 1, wherein
    the seal bearing is positioned at boundaries of a toner space where toner is placed and an external space so as to hold the shaft that passes through the toner space and the external space,
    the seal part is positioned at the toner space side, and
    an outer diameter of the shaft ($\varphi a$, an inner diameter of the bearing surface $\varphi b$, and an inner diameter of the seal part ($\varphi c$) satisfy $\varphi c < \varphi a < \varphi b$.

* * * * *